United States Patent Office 3,808,283
Patented Apr. 30, 1974

3,808,283
PROCESS FOR THE DIMERIZATION
OF CYCLOPENTENES
Wolfgang Schneider, Brecksville, Ohio, assignor to The
B. F. Goodrich Company, New York, N.Y.
No Drawing. Filed June 4, 1973, Ser. No. 366,699
Int. Cl. C07c 3/18
U.S. Cl. 260—666 A                                      10 Claims

ABSTRACT OF THE DISCLOSURE

Dimerization of cyclopentene and substituted cyclopentenes is effected with a catalyst system comprising a nickel salt or coordination compound; a reducing agent used when the nickel salt or coordination compound is reducible; a Group II–A or III–A metal or compound; and a halide.

BACKGROUND OF THE INVENTION

U.S. Pat. 2,969,408 teaches the production of dimers, trimers, tetramers and the higher polymers of cyclic olefins. Ultraviolet irradiation of cyclopentene in acetone to produce 3-cyclopentylcyclopentene and several other compounds is taught by Scharf et al., Ber. 97 (9), pp. 2425–2433 (1964). Fr. Demande 2,014,769 (Apr. 17, 1970) teaches cyclopentene dimerization using ethyl aluminum sesquichloride; optionally, several other compounds; and $ZrCl_4$, $TaCl_5$, $CoCl_2$, $CuCl_2$, Co(III)acetylacetonate, Ni acetylacetone or $NiBr_2$. Cyclopentene, polymerized by $P_2O_5$-on-pumice, gives 37% cyclopentylcyclopentene and 15% other material, consisting mainly of trimer, according to the teaching of Truffault et al., Compt. rend. 231, pp. 1068–1070 (1950). Other art is well known describing production of 1-cyclopentylcyclopentene, 3-cyclopentylcyclopentene, cyclopentylidenecyclopentane and mixtures thereof from cyclopentene derivatives. A new method of preparing cyclopentene dimers is desired.

SUMMARY OF THE INVENTION

It has been found that dimerization of cyclopentene and substituted cyclopentenes is effected by mixing the monomer with a catalyst system that comprises (A) a nickel salt or coordination compound; (B) at least one Group II–A or III–A hydride, alkyl hydride, alkyl or alkyl alkoxide which functions as a reducing agent and is used when the nickel salt or coordination compound is reducible; (C) at least one Group II–A or III–A hydride, alkyl hydride, alkyl, alkyl alkoxide, halide or halide etherate; and (D) at least one halide present as a Group II–A or III–A metal halide, a Group II–A or III–A metal halide etherate, an alkyl or aryl halide, an alkenyl halide, or as a part of the nickel salt or coordination compound.

DETAILED DESCRIPTION

The cyclopentene compounds suitable for use in the process of this invention have the structural formula

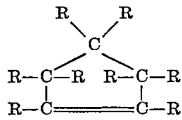

wherein R is selected from the group consisting of a hydrogen atom and alkyl, aryl, alkaryl, aralkyl and cycloalkyl radicals containing 1 to 8 carbon atoms. Examples of cyclopentenes which can be dimerized according to my invention include cyclopentene, 3-methylcyclopentene, and the like.

Examples of nickel compounds used include salts of inorganic acids such as nickel fluoride, nickel dichloride, nickel bromide, nickel iodide, nickel hydroxide, nickel nitrate, nickel orthophosphate, nickel sulfate, and the like; salts of organic acids such as nickel acetate, nickel citrate, nickel formate, nickel oxalate, nickel succinate, nickel tartrate, and the like; and coordination compounds such as nickel acetylacetonate, bisacrolein nickel, bisacrylonitrile nickel, bisfumaryl chloride nickel, bisfumaryl nitrile nickel, and the like. Mixtures of these compounds may also be employed. Zero-valent nickel compounds such as bisacrolein nickel and the like need not be reduced.

The reducing agents may be Group II–A or III–A hydrides or alkyl hydrides, alkyls or alkyl alkoxides having 1 to 12 carbon atoms, such as alkyl aluminum hydrides, lithium alkyls, beryllium alkyls, aluminum alkyls, alkyl aluminum alkoxides, and the like. More usually employed are aluminum alkyl hydrides, aluminum alkyls, and aluminum alkyl alkoxides having the forula $AlR_3$ or $AlR_xZ_y$, wherein R is an alkyl group containing 1 to 12 carbon atoms, preferably 2 to 8, Z is alkoxy having 1 to 12 carbon atoms or hydride, and x is 1 or 2, y is 1 or 2, $x+y=3$. Examples of such compounds include diethyl aluminum hydride, diisobutyl aluminum hydride, triethyl aluminum, tributyl aluminum, triisobutyl aluminum, diethyl aluminum ethoxide, and the like. Mixtures of these compounds may also be employed. Other useful organometallic compounds include zinc diethyl, and Grignard reagents such as ethyl magnesium bromide and other alkyl magnesium halides wherein the alkyl group contains 1 to 12 carbon atoms.

In many cases, the use of an alkyl halide having 1 to 12 carbon atoms and preferably 2 to 8, an aryl halide having 6 to 14 carbon atoms, a Group II–A or III–A metal halide or a Group II–A or III–A metal etherate having 1 to 12 carbon atoms along with the nickel compound is of advantage. Of the halides, the bromides, chlorides and fluorides are preferred. Examples of suitable compounds include chloropropane, ethyl chloride, ethyl bromide, boron trichloride, boron halide etherates such as boron fluoride ethyl etherate, aluminum bromide, aluminum chloride, and the like. Mixtures of these compounds may also be employed.

Alkenyl halides form reactive catalysts when mixed with a nickel salt and a reducing agent described heretofore. Preferably, the nickel salt and the alkenyl halide are mixed before a reducing agent is employed. Preferred are alkenyl halides containing 2 to 8 carbon atoms. Even more preferred are alkenyl halides containing 2 to 8 carbon atoms and bromine or chlorine. Examples of suitable alkenyl halides include crotyl chloride, 1-bromopropene-1; 2 - bromopropene-1; 1 - chloropropene-1; 2 - chloropropene-1; 3-chloropropene-1; 3-chloro-2-methyl propene; 2-chlorobutene-2, and the like. Mixtures of these compounds may also be employed.

The catalyst combination comprises (A) a nickel salt or coordination compound; (B) at least one Group II–A or III–A hydride, alkyl hydride, alkyl or alkyl alkoxide which functions as a reducing agent and is used when the nickel salt or coordination compound is reducible; (C) at least one Group II–A or III–A hydride, alkyl hydride, alkyl, alkyl alkoxide, halide or halide etherate: and (D) at least one halide present as a Group II–A or III–A metal halide, a Group II–A or III–A metal halide etherate, an alkyl or aryl halide, an alkenyl halide, or as a part of the nickel salt or coordination compound. Examples of suit- combinations include a nickel halide and an aluminum trialkyl; a nickel salt, an aluminum alkyl hydride and aluminum chloride; a zero-valent nickel coordinaiton compound and a boron halide etherate; and the like.

More preferably, the catalyst combination comprises (A) a nickel salt or coordination compound, (B) at least one Group II–A or III–A hydride, or alkyl hydride, alkyl or alkyl alkoxide having 1 to 12 carbon atoms, and present when the nickel compound is reducible; (C) at least one Group II–A or III–A hydride or halide, or alkyl hydride, alkyl, alkyl alkoxide or halide etherate having 1 to 12 carbon atoms; and (D) at least one halide present as a Group II–A or III–A metal halide, a Group II–A or III–A metal halide etherate having 1 to 12 carbon atoms, an alkyl halide having 1 to 12 carbon atoms, an aryl halide having 6 to 14 carbon atoms, an alkenyl halide having 2 to 8 carbon atoms, or as a part of the nickel salt or coordination compound.

Even more preferably, the catalyst combination comprises (A) a nickel salt or coordination compound; (B) at least one compound selected from the group consisting of aluminum alkyl hydrides, aluminum alkyls and aluminum alkyl alkoxides having the formula $AlR_3$ or $AlR_xZ_y$, wherein R is an alkyl group having 1 to 12 carbon atoms, preferably 2 to 8, Z is alkoxy or hydride, and $x$ is 1 or 2, $y$ is 1 or 2, and $x+y=3$; (C) is at least one compound selected from (B) and aluminum halide and Group III–A metal halide etherates having 1 to 12 carbon atoms; and (D) is at least one halide present as a Group III–A metal halide, a Group III–A metal halide etherate having 1 to 12 carbon atoms, an alkyl halide having 2 to 8 carbon atoms, an aryl halide having 6 to 14 carbon atoms, an alkenyl halide having 2 to 8 carbon atoms and bromine or chlorine, or as a part of the nickel salt or coordination compound.

The amount of nickel salt or coordination compound preferably may be varied from about 0.0001 to about 100 millimoles per mole of cyclopentene, more preferably from about 0.001 to 10.0. The molar ratio is from about ⅓ of Group II–A or III–A compound to nickel salt or coordination compound up to a molar ratio of about 10/1. Larger amounts of Group II–A or III–A compound and nickel salt or coordination compound may be used but are expensive. An alkyl halide, aryl halide or alkenyl halide, when used, may be varied in a molar ratio of from about ⅓ of alkyl halide, aryl halide, or alkenyl halide to nickel salt up to a molar ratio of about 10/1. More preferably, said molar ratios are from greater than 1/1 to about 5/1.

The complex nickel compounds are prepared easily by refluxing nickel carbonyl with acrylonitrile, acrolein and the like. The catalyst may be prepared by adding the components separately or as a mixture to a reactor, either in the cyclopentene or in an inert solvent such as chlorobenzene or methylene chloride. If a nickel complex is to be made from a nickel salt in a solvent other than cyclopentene, it is preferred that this be done before adding a reducing agent; such as precaution may avoid reduction of nickel salt to nickel metal which settles out of the reaction mixture. The mixing of the catalyst components and the reaction are generally carried out in an inert atmosphere and in the substantial absence of air or water. The reaction is conducted under sufficient pressure to keep the cyclopentene in liquid state, the pressure required depending upon the temperature of reaction.

Any conventional contacting technique may be used for the dimerization reaction in a batch or continuous operation. The reaction is exothermic and may proceed at a temperature of from about $-20°$ C. to about $150°$ C., preferably from about $10°$ C. to about $70°$ C. After the reaction period, the products can be separated and/or isolated by conventional methods such as by fractionation, crystallization, adsorption, and the like; and unconverted feed material may be recycled.

The primary products of the process of the present invention are cyclopentene dimer isomers cyclopentylidenecyclopentane and 1-cyclopentylcyclopentene, and derivatives thereof having the structures

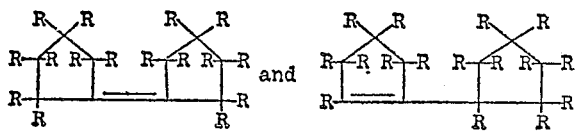

respectively, wherein R is as defined heretofore. Trace amounts are produced of cyclopentene dimer isomers 3-cyclopentylcyclopentene and 4-cyclopentylcyclopentene and derivatives thereof having the structures

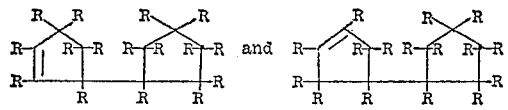

respectively, wherein R is as defined heretofore. Higher oligomers may also be produced.

The products of the present invention have many uses. For example, cyclopentene dimer is used to prepare rubbers and plastics by ring opening polymerization techniques known to those skilled in the art.

The following examples serve to illustrate the invention more fully.

EXAMPLE I

A glass reactor was well-cleaned prior to the run with soap and water, followed by an acetone rinse and flushed with nitrogen until dry. An argon gas atmosphere was maintained in the reactor. 14 grams (0.2 mole) of cyclopentene was dried over lithium aluminum hydride and charged to the reactor, followed by addition of 0.26 gram (1 millimole) of nickel acetylacetonate, 0.5 milliliter (3 millimoles) of diisobutyl aluminum hydride, and 0.5 gram (4 millimoles) of aluminum chloride. The reaction was stirred and allowed to run for 16 hours at 75° C. and resulted in an approximate yield of 30% cyclopentylidenecyclopentane, 30% 1-cyclopentylcyclopentene, 17% higher oligomers and 23% unreacted cyclopentene as measured by gas chromatography and NMR. Trace amounts were produced of 3-cyclopentylcyclopentene and 4-cyclopentylcyclopentene. No dimerization occurred when this experiment was repeated using cyclohexene, cycloheptene and cyclooctene respectively in place of cyclopentene.

EXAMPLE II

A glass reactor was well-cleaned prior to the run with soap and water, followed by an acetone rinse and flushed wtih nitrogen until dry. An argon gas atmosphere was maintained in the reactor. 14 grams (0.2 mole) of cyclopentene was dried over lithium aluminum hydride and charged to the reactor, followed by addition of 0.26 gram (1 millimole) of nickel acetylacetonate, 0.5 milliliter (4 millimoles) of triethyl aluminum and 0.5 gram (4 millimoles) of aluminum chloride. The reaction was stirred and allowed to run 16 hours at 75° C. and resulted in an approximate yield of 33% cyclopentylidenecyclopentane, 18% 1-cyclopentylcyclopentene, 40% higher oligomers and 9% unreacted cyclopentene as measured by gas chromatography and NMR. Trace amounts were produced of 3-cyclopentylcyclopentene and 4-cyclopentylcyclopentene. No dimerization occurred when this experiment was repeated using cyclohexene, cycloheptene and cyclooctene, respectively, in place of cyclopentene.

EXAMPLE III

A glass reactor was well-cleaned prior to the run with soap and water, followed by an acetone rinse and flushed with nitrogen until dry. An argon gas atmosphere was maintained in the reactor. 14 grams (0.2 mole) of cyclopentene was charged to the reactor, followed by addition of 0.26 gram (1 millimole) of nickel acetylacetonate, 1 milliliter (8 millimoles) of triethyl aluminum, and 0.5 milliliter (4 millimoles) of boron fluoride ethyl etherate. The reaction was stirred and allowed to run 16 hours at 75° C. and resulted in an approximate yield of 36% cyclopentylidenecyclopentane, 14% 1-cyclopentylcyclopentene, 2% mixed 3-cyclopentylcyclopentene and 4-cyclopentylcyclopentene, and 48% unreacted cyclopentene in material eluted from a gas chromatographic column; higher oligomers remained behind in the column and were not analyzed. No dimerization occurred when this experiment was repeated using cyclooctene in place of cyclopentene.

EXAMPLE IV

A glass reactor was well-cleaned prior to the run with soap and water, followed by an acetone rinse and flushed with nitrogen until dry. An argon gas atmosphere was maintained in the reactor. 14 grams (0.2 mole) of cyclopentene was charged to the reactor, followed by addition of 0.13 gram (1 millimole) of nickel dichloride, 1 milliliter (9 millimoles) of diethyl aluminum hydride, 0.5 gram (4 millimoles) of aluminum chloride, and 0.2 milliliter (2 millimoles) of 3-chloropropene-1. The reaction was allowed to run 16 hours at 75° C. and resulted in an approximate yield of 21% cyclopentylidenecyclopentane, 6% 1-cyclopentylcyclopentene, 3% mixed 3-cyclopentylcyclopentene and 4-cyclopentylcyclopentene, and 70% unreacted cyclopentene in material eluted from a gas chromatographic column; higher oligomers remained behind in the column and were not analyzed. No dimerization occurred when this experiment was repeated using cyclooctene in place of cyclopentene.

I claim:

1. A process for the dimerization of cyclopentenes of the formula

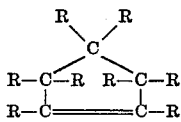

wherein R is selected from the group consisting of a hydrogen atom and alkyl, aryl, alkaryl, aralkyl and cycloalkyl radicals containing from 1 to 8 carbon atoms, with a catalytic amount of (A) a nickel salt or coordination compound, (B) at least one Group II-A or III-A hydride, or alkyl hydride, alkyl or alkyl alkoxide having 1 to 12 carbon atoms, and present when the nickel compound is reducible, (C) at least one Group II-A or III-A hydride or halide, or alkyl hydride, alkyl, alkyl alkoxide or halide etherate having 1 to 12 carbon atoms, and (D) at least one halide present as a Group II-A or III-A metal halide, a Group II-A or III-A metal halide etherate having 1 to 12 carbon atoms, an alkyl halide having 1 to 12 carbon atoms, an aryl halide having 6 to 14 carbon atoms, an alkenyl halide having 2 to 8 carbon atoms, or as a part of the nickel salt or coordination compound.

2. A process of claim 1 wherein (A) is a nickel salt or coordination compound, (B) is at least one compound selected from the group consisting of aluminum alkyl hydrides, aluminum alkyls, and aluminum alkyl alkoxides having the formula $AlR_3$ or $AlR_xZ_y$, wherein R is an alkyl group having 1 to 12 carbon atoms, Z is alkoxy having 1 to 12 carbon atoms or hydride, and $x$ is 1 or 2, $y$ is 1 or 2, and $x+y=3$, (C) is at least one compound selected from (B) and aluminum halides and Group III-A metal halide etherates having 1 to 12 carbon atoms, and (D) is at least one halide present as a Group III-A metal halide, a Group III-A metal halide etherate having 1 to 12 carbon atoms, an alkyl halide having 2 to 8 carbon atoms, an aryl halide having 6 to 14 carbon atoms, an alkenyl halide having 2 to 8 carbon atoms and bromine or chlorine, or as a part of the nickel salt or coordination compound.

3. A process of claim 1 wherein the amount of nickel salt or coordination compound is from about 0.0001 millimole to about 100 millimoles per mole of cyclopentene or substituted cyclopentene, the molar ratio of Group II-A or III-A compound or mixture thereof to nickel salt or coordination compound is from about 1/3 to about 10/1, and the molar ratio to nickel salt or coordination compound of an alkyl halide, aryl halide or alkenyl halide, or mixture thereof, when used, is from about 1/3 to about 10/1.

4. A process of claim 3 wherein the amount of nickel salt or coordination compound is from about 0.001 millimole to about 10 millimoles per mole of cyclopentene or substituted cyclopentene, the molar ratio of Group II-A or III-A compound or mixture thereof to nickel salt or coordination compound is from greater than 1/1 to about 5/1, and the molar ratio to nickel salt or coordination compound of an alkyl halide, aryl halide, or alkenyl halide, or mixture thereof, when used, is from greater than 1/1 to about 10/1.

5. A process of claim 2 wherein the amount of nickel salt or coordination compound is from about 0.0001 millimole to about 100 millimoles per mole of cyclopentene or substituted cyclopentene, the molar ratio of Group III-A compound to nickel salt or coordination compound is from about 1/3 to about 10/1, and the molar ratio to nickel salt or coordination compound of an alkyl halide, aryl halide or alkenyl halide, or mixture thereof, when used, is from about 1/3 to about 10/1.

6. A process of claim 5 wherein the amount of nickel salt or coordination compound is from about 0.001 millimole to about 10 millimoles per mole of cyclopentene or substituted cyclopentene, the molar ratio of Group III-A compound to nickel salt or coordination compound is from greater than 1/1 to about 5/1, and the molar ratio to nickel salt or coordination compound of an alkyl halide, aryl halide or alkenyl halide or mixture thereof, when used, is from greater than 1/1 to about 10/1.

7. A process of claim 6 wherein (A) is nickel acetylacetonate, (B) is diisobutyl aluminum hydride, (C) is diisobutyl aluminum hydride and aluminum chloride, and (D) is aluminum chloride.

8. A process of claim 6 wherein (A) is nickel acetylacetonate, (B) is triethyl aluminum, (C) is triethyl aluminum and aluminum chloride, and (D) is aluminum chloride.

9. A process of claim 6 wherein (A) is nickel dichloride, (B) is diethyl aluminum hydride, (C) is diethyl aluminum hydride and aluminum chloride, and (D) is nickel dichloride, aluminum chloride and 3-chloropropene-1.

10. A process of claim 6 wherein (A) is nickel acetylacetonate, (B) is triethyl aluminum, (C) is triethyl aluminum and boron fluoride ethyl etherate, and (D) is boron fluoride ethyl etherate.

References Cited

UNITED STATES PATENTS 2,419,668   4/1947   Bearse et al. _____ 260—666 A

FOREIGN PATENTS 2,014,769   4/1970   France.

DELBERT E. GANTZ, Primary Examiner

V. O'KEEFE, Assistant Examiner

U.S. Cl. X.R.

260—666 A